US012784481B2

(12) United States Patent
Potnis et al.

(10) Patent No.: US 12,784,481 B2
(45) Date of Patent: Nov. 3, 2026

(54) VEHICULAR DRIVER/OCCUPANT MONITORING SYSTEM WITH ENHANCED LEARNING MODELS

(71) Applicant: Magna Electronics Inc., Auburn Hills, MI (US)

(72) Inventors: Anuj S. Potnis, Hösbach (DE); Smruti Ranjan Kar, Bietigheim-Bissingen (DE)

(73) Assignee: Magna Electronics Inc., Auburn Hills, MI (US)

( * ) Notice: Subject to any disclaimer, the term of this patent is extended or adjusted under 35 U.S.C. 154(b) by 260 days.

(21) Appl. No.: 18/804,333

(22) Filed: Aug. 14, 2024

(65) Prior Publication Data

US 2025/0061734 A1 Feb. 20, 2025

Related U.S. Application Data

(60) Provisional application No. 63/519,898, filed on Aug. 16, 2023.

(51) Int. Cl.

| | |
|---|---|
| ***G06V 20/00*** | (2022.01) |
| ***G06V 10/143*** | (2022.01) |
| ***G06V 10/774*** | (2022.01) |
| ***G06V 20/59*** | (2022.01) |
| ***G06V 20/70*** | (2022.01) |

(52) U.S. Cl.

CPC ............ *G06V 20/70* (2022.01); *G06V 10/143* (2022.01); *G06V 10/774* (2022.01); *G06V 20/597* (2022.01)

(58) Field of Classification Search

CPC .... G06V 20/70; G06V 10/143; G06V 10/774; G06V 20/59

See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 7,914,187 | B2 | 3/2011 | Higgins-Luthman et al. |

(Continued)

FOREIGN PATENT DOCUMENTS

WO 2023220222 A1 11/2023

*Primary Examiner* — Xiao Liu

(74) *Attorney, Agent, or Firm* — HONIGMAN LLP

(57) ABSTRACT

A method for training a vehicular occupant monitoring system includes disposing a first camera at a test vehicle that captures first image data representative of electromagnetic radiation having a first range of wavelengths and a second camera that captures second image data representative of electromagnetic radiation having a second range of wavelengths. The method includes disposing markers at an occupant seated at the seat of the test vehicle that, based on the first range and the second range of wavelengths, are (i) represented in the second image data and (ii) not represented in the first image data. The method includes annotating, using one or more frames of captured second image data comprising the imaged markers, locations of the markers at the occupant within one or more frames of captured first image data and training the vehicular occupant monitoring system using the annotated frames.

25 Claims, 2 Drawing Sheets

(56) References Cited

U.S. PATENT DOCUMENTS

| | | | |
|---|---|---|---|
| 9,405,120 | B2 | 8/2016 | Graf et al. |
| 10,017,114 | B2 | 7/2018 | Bongwald |
| 10,065,574 | B2 | 9/2018 | Tiryaki |
| 10,958,830 | B2 | 3/2021 | Koravadi |
| 11,518,401 | B2 | 12/2022 | Kulkarni |
| 11,582,425 | B2 | 2/2023 | Liu |
| 11,639,134 | B1 | 5/2023 | Huizen et al. |
| 11,780,372 | B2 | 10/2023 | Sobecki et al. |
| 11,827,153 | B2 | 11/2023 | Miller et al. |
| 2014/0336876 | A1 | 11/2014 | Gieseke et al. |
| 2015/0009010 | A1 | 1/2015 | Biemer |
| 2015/0015710 | A1 | 1/2015 | Tiryaki |
| 2015/0022664 | A1 | 1/2015 | Pflug et al. |
| 2015/0092042 | A1 | 4/2015 | Fursich |
| 2015/0232030 | A1 | 8/2015 | Bongwald |
| 2015/0294169 | A1 | 10/2015 | Zhou et al. |
| 2015/0296135 | A1 | 10/2015 | Wacquant et al. |
| 2015/0352953 | A1 | 12/2015 | Koravadi |
| 2016/0137126 | A1 | 5/2016 | Fursich et al. |
| 2016/0209647 | A1 | 7/2016 | Fursich |
| 2017/0217367 | A1 | 8/2017 | Pflug et al. |
| 2017/0274906 | A1 | 9/2017 | Hassan et al. |
| 2018/0215233 | A1* | 8/2018 | Neveu .................. G01J 5/0025 |
| 2018/0222414 | A1 | 8/2018 | Ihlenburg et al. |
| 2018/0231976 | A1 | 8/2018 | Singh |
| 2019/0210615 | A1 | 7/2019 | Caron et al. |
| 2020/0143560 | A1 | 5/2020 | Lu et al. |
| 2020/0202151 | A1 | 6/2020 | Wacquant |
| 2020/0320320 | A1 | 10/2020 | Lynam |
| 2021/0174103 | A1* | 6/2021 | Schumacher ........... G06F 18/22 |
| 2021/0291739 | A1 | 9/2021 | Kasarla et al. |
| 2021/0323473 | A1 | 10/2021 | Peterson et al. |
| 2022/0242438 | A1 | 8/2022 | Sobecki et al. |
| 2022/0254132 | A1 | 8/2022 | Rother |
| 2022/0377219 | A1 | 11/2022 | Conger et al. |
| 2023/0093198 | A1* | 3/2023 | Szelest .................. G06V 20/41 709/204 |
| 2024/0168355 | A1 | 5/2024 | Baur |
| 2024/0190456 | A1 | 6/2024 | P et al. |
| 2024/0241055 | A1* | 7/2024 | Li ..................... G01N 21/6456 |
| 2024/0383406 | A1 | 11/2024 | Sobecki |

* cited by examiner

VEHICULAR DRIVER/OCCUPANT MONITORING SYSTEM WITH ENHANCED LEARNING MODELS

CROSS REFERENCE TO RELATED APPLICATION

The present application claims the filing benefits of U.S. provisional application Ser. No. 63/519,898, filed Aug. 16, 2023, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A method for training a vehicular occupant monitoring system includes disposing a first camera at a test vehicle. The first camera views at least a seat within an interior cabin of the test vehicle. The first camera is operable to capture first image data representative of electromagnetic radiation incident at the first camera and having a first range of wavelengths. The method includes disposing a second camera at the test vehicle. The second camera views at least the seat within the interior cabin of the test vehicle, and the second camera is operable to capture second image data representative of electromagnetic radiation incident at the second camera and having a second range of wavelengths. The first range of wavelengths of electromagnetic radiation and the second range of wavelengths of electromagnetic radiation are different. The method includes disposing markers at an occupant seated at the seat of the test vehicle. The markers, based on the first range of wavelengths of electromagnetic radiation incident at the camera and the second range of wavelengths of electromagnetic radiation incident at the camera, are (i) represented in second image data captured by the second camera and (ii) not represented in first image data captured by the first camera. The method also includes capturing, using the first camera, first image data and capturing, using the second camera, second image data. The method also includes annotating, using one or more frames of captured second image data that includes the imaged markers, locations of the markers at the occupant within one or more frames of captured first image data. The method also includes training the vehicular occupant monitoring system using the annotated one or more frames of captured first image data. The trained vehicular occupant monitoring system is configured to monitor occupants of a vehicle equipped with the vehicular occupant monitoring system.

These and other objects, advantages, purposes and features of the present invention will become apparent upon review of the following specification in conjunction with the drawings.

DESCRIPTION OF THE PREFERRED EMBODIMENTS

A vehicular driver monitoring system or a vehicular occupant monitoring system operates to capture image data interior of the vehicle and may process the captured image data to detect objects within the vehicle, such as to monitor an occupant of the vehicle. The monitoring system includes an image processor or image processing system that is operable to receive image data from one or more cameras and may provide an output to a machine learning model that processes the image data to classify scenarios captured by the image data.

Figure 1:
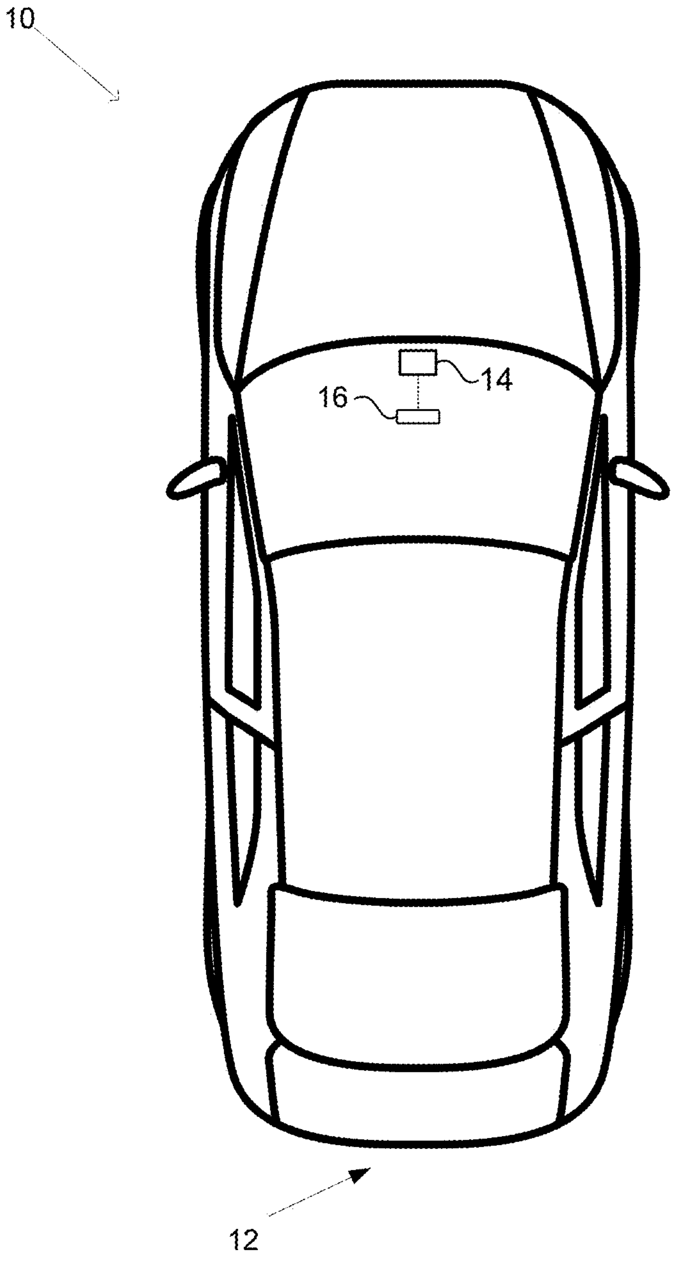
FIG. 1 is a plan view of a vehicle with a vision system that incorporates cameras.

Referring now to the drawings and the illustrative embodiments depicted therein, a vehicle 10 includes a driver monitoring system or occupant monitoring system 12 that includes at least one interior viewing imaging sensor or camera 14 which captures images interior of the vehicle, with the camera having a lens for focusing images at or onto an imaging array or imaging plane or imager of the camera (FIG. 1). Optionally, an interior viewing camera is disposed at the windshield of the vehicle or a dashboard of the vehicle or at a headliner of the vehicle and views one or more occupants of the vehicle, such as for a machine vision system (such as for a driver alertness system or the like). The monitoring system 12 includes a control or electronic control unit (ECU) 16 having electronic circuitry and associated software, with the electronic circuitry including a data processor or image processor that is operable to process image data captured by the camera or cameras, whereby the ECU may detect or determine presence of objects or the like. The data transfer or signal communication from the camera to the ECU may comprise any suitable data or communication link, such as a vehicle network bus or the like of the equipped vehicle.

For a driver monitoring system (DMS) and/or an occupant monitoring system (OMS), a visible light camera (i.e., a camera that captures image data in the visible light spectrum) and/or a near-infrared camera (i.e., a camera that captures image data in the near-infrared light spectrum) may be used as a vehicle sensor to monitor one or more occupants of a vehicle. In some examples, deep learning algorithms for the system are configured to process the captured image data to predict the presence of an occupant of a vehicle equipped with the system and describe or classify or categorize the activity performed by the occupant (e.g., speaking, texting, eating, smoking, sleeping, etc.). When training machine learning models for these tasks, the scenarios may be orchestrated. However, before releasing a product for production, it is often desired to train on more naturalistic drives. Because human behavior is different in a natural drive as compared to a predefined scenario, results of the natural drive can also be used to fine tune the model further.

One of the biggest challenges of validating a deep learning model or a machine learning model (e.g., a neural network such as a deep neural network (DNN)) on such naturalistic drives is ground truth data. These models must be trained using data (e.g., frames of image data) annotated with the ground truth. For example, when the model determines regions of interest of an occupant to classify the activity of the occupant, the training data may include ground truth annotations that label regions of interest of the occupants. That is, the models generally require a human evaluator to go through the entire video and identify scenarios of interest, followed by precise annotation of the key points. In the case of human activity recognition/classification, the annotation may involve marking key joints of the occupant (e.g., shoulders, elbows, wrists, etc.). This process is conventionally performed manually (e.g., by one or more human annotators). However, this is an extremely laborious process that is both expensive and prone to human error. An approach to this problem is to add markers to these key points or regions of interest (e.g., joints), however, these markers cannot be visible in the images captured by the development cameras (i.e., the cameras capturing image data for the model to train on), as the markers may interfere with the training of the model. That is, if the markers are visible in the image data processed by the model, the presence of the markers may influence the training of the model.

Figure 2:
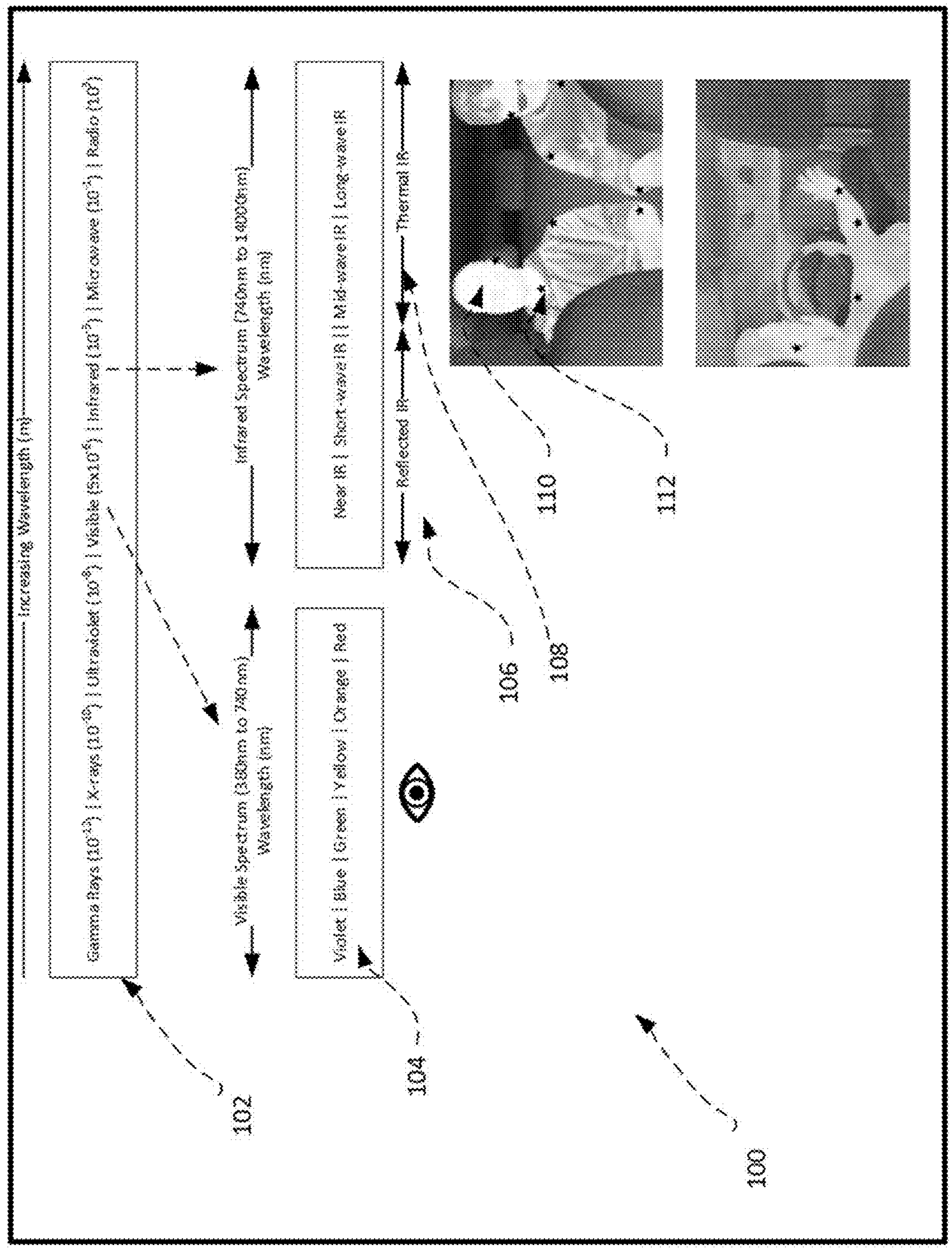
FIG. 2 is a view of images captured by a thermal infrared camera that include occupants wearing thermal markers.

Implementations herein include methods and systems for developing and testing a vehicular driver monitoring system and/or a vehicular occupant monitoring system. As shown in FIG. 2, the implementations include a system 100 for capturing image data of an occupant of a vehicle (as used herein, the term "occupant" may refer to a human occupant or an artificial occupant, such as a dummy that represents the size and shape of a human occupant) using a first camera or an occupant monitoring system camera disposed within a vehicle. The first camera captures image data to be used to train one or more machine learning models of the occupant monitoring system. The first camera captures image data using a first spectrum of light 104, 106 (i.e., a first range of wavelengths) of the electromagnetic spectrum 102. For example, the first spectrum of light is visible light and/or near-infrared light and/or short-wave infrared light. That is, the first imager is sensitive to the range of wavelengths of visible light and/or near-infrared light and/or short-wave infrared electromagnetic radiation and is not sensitive to other wavelengths of electromagnetic radiation, or the other wavelengths are filtered (e.g., by a filter on or in front of the lens of the camera) or attenuated and not imaged by the first imager (such as mid-wave infrared electromagnetic radiation or long-wave infrared electromagnetic radiation). A second camera disposed within the vehicle captures image data using a second spectrum of light 108 (i.e., a second range of wavelengths) that is different from the first spectrum of light. That is, at least a portion of the spectrum of light imaged by the second camera is not imaged by the first camera (i.e., at least a portion of the first range of wavelengths and the second range of wavelengths do not overlap). For example, the second spectrum of light is thermal infrared and/or mid-wave infrared and/or long-wave infrared electromagnetic radiation. That is, the second imager is sensitive to the range of wavelengths of infrared or mid-wave infrared or long-wave infrared electromagnetic radiation and is not sensitive to other wavelengths of electromagnetic radiation, or the other wavelengths are filtered or attenuated and not imaged by the second imager.

An occupant 110 within the vehicle wears or otherwise equips one or more markers 112 that are visible to the second camera (i.e., markers that reflect or radiate or emit light in the second spectrum) but are not visible to the first camera (i.e., the markers do not reflect or radiate light in the first spectrum). For example, the markers are thermal markers that have a temperature that is greater than or less than the ambient temperature of the surroundings. The markers may, for example, be worn under clothing worn by the occupant. In this way, the temperature change may be visible within the second spectrum of light captured by the second camera (e.g., by heating/cooling the clothing above the marker) and not visible within the first spectrum of light captured by the first camera (as the clothing blocks view of the actual marker). Other means of ensuring the markers are not visible to the first camera may be used. For example, the markers may be translucent to the wavelengths of light imaged by the first camera. The temperature of each marker may be adjusted to represent a specific region of interest. For example, a marker representing a wrist of an occupant may be a different temperature than a marker representing an elbow of the occupant. That is, the specific region of interest the marker is assigned to may dictate the temperature of the object (or the wavelengths that the marker emits/reflects).

The markers may be placed on the occupant at one or more regions of interest to the models being trained. For example, the markers may be placed at one or more joints of the occupant (e.g., shoulders, elbows, wrists, etc.). By adjusting the temperature of these markers, the locations of the markers are distinctly highlighted in the image data captured by the second camera but are not visible in the image data captured by the first camera.

In some examples, the markers are passive and reflect light that materials around the marker absorb, thus making the markers apparent in the image data captured by the second camera. For example, a light source mounted at the roof of the vehicle emits light (at a wavelength not discernible by the first camera) toward the markers that the markers reflect toward the second camera. In other examples, the markers are active and actively emit electromagnetic waves that can be imaged by the second camera but not the first camera. While the examples above discuss using thermal IR for the markers and second camera, any portion of the electromagnetic spectrum that is not captured by the first camera and can be captured by the second camera (or other image sensor) may be used.

Using traditional image processing techniques, frames of image data captured by the first camera (where the markers are not visible) may be annotated or labeled using the image data captured by the second camera (where the markers are visible). That is, using one or more image processing techniques, the locations of the markers in the image data captured by the second camera (easily identifiable based on the temperature adjustment) are translated to locations in the image data captured by the first camera (where the markers are not visible or easily identifiable). The first camera and the second camera may have the same or similar fields of view to ease the translation of locations. For example, the second camera may be disposed at or near the first camera. Optionally, a single camera may be used (that is sensitive to both the first and second spectral ranges of wavelengths and thus images light or radiation having both the first and second spectral ranges of wavelengths) and a filter may be alternatingly placed at or in front of the imager to alternatingly expose the imager to the different spectral ranges, whereby processing of the frames of image data captured when the filter is present (or is not present, depending on the filter) may be used to annotate or label the frames of image data captured when the filter is not present (or is present). Optionally, the camera may include two imagers or different portions of the same imagers that are sensitive to different wavelengths of light.

The implementations herein relate to methods and systems for developing and testing vehicular driver and occupant monitoring systems through the use of dual-camera imaging and machine learning. The system employs a first camera to capture image data in a first spectrum of light, such as visible, near-infrared, or short-wave infrared light, to train machine learning models. A second camera captures image data in a different spectrum, such as thermal, mid-wave, or long-wave infrared light, to detect markers not visible to the first camera. These markers, which may be worn by the vehicle occupant and have adjustable temperatures to signify specific regions of interest, are visible in the second spectrum and can be placed at various joints or points on the occupant's body. Image data from the second camera, which highlights the markers, is used to annotate or label the image data from the first camera, where the markers are not visible. This process is facilitated by aligning the fields of view of both cameras or by using a single camera with a filter to alternate between spectral ranges. This approach allows for precise monitoring and enhanced machine learning model training by distinguishing specific regions of interest on the occupant, even when obscured by clothing or not visible in certain light spectra. This allows for the creation of a large amount of accurate training data for the models automatically or semi-automatically without the extensive manual labor traditionally required.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor of the camera may capture image data for image processing and may comprise, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 11,827,153; 11,780,372; 11,639,134; 11,582,425; 11,518,401; 10,958,830; 10,065,574; 10,017,114; 9,405,120 and/or 7,914,187, and/or U.S. Publication Nos. US-2024-0190456; US-2024-0168355; US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 18/666,959, filed May 17, 2024, and/or U.S. provisional application Ser. No. 63/641,574, filed May 2, 2024, and/or International Publication No. WO 2023/220222, which are all hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward-viewing camera, as well as from a rearward-viewing camera and sideward-viewing cameras of the CMS (e.g., a rearward-viewing camera disposed at the rear of the vehicle remote from the rear backup camera of the vehicle, and rearward-viewing cameras disposed at respective sides of the vehicle, such as at respective side-mounted exterior rearview mirror assemblies of the vehicle), to provide the driver with unique collision mitigation capabilities based on full vehicle environment and driver awareness state. The rearward viewing camera may comprise a rear backup camera of the vehicle or may comprise a centrally located higher mounted camera (such as at a center high-mounted stop lamp (CHMSL) of the vehicle), whereby the rearward viewing camera may view rearward and downward toward the ground at and rearward of the vehicle. The image processing and detections and determinations are performed locally within the interior rearview mirror assembly and/or the overhead console region, depending on available space and electrical connections for the particular vehicle application. The CMS cameras and system may utilize aspects of the systems described in U.S. Publication Nos. US-2021-0245662; US-2021-0162926; US-2021-0155167; US-2018-0134217 and/or US-2014-0285666, and/or International Publication No. WO 2022/150826, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for training a vehicular occupant monitoring system, the method comprising:

disposing a first camera at a test vehicle, wherein the first camera views at least a seat within an interior cabin of the test vehicle, and wherein the first camera is operable to capture first image data representative of electromagnetic radiation incident at the first camera and having a first range of wavelengths;

disposing a second camera at the test vehicle, wherein the second camera views at least the seat within the interior cabin of the test vehicle, and wherein the second camera is operable to capture second image data representative of electromagnetic radiation incident at the second camera and having a second range of wavelengths;

wherein the first range of wavelengths of electromagnetic radiation and the second range of wavelengths of electromagnetic radiation are different;

disposing markers at an occupant seated at the seat of the test vehicle, wherein the markers, based on the first range of wavelengths of electromagnetic radiation incident at the first camera and the second range of wavelengths of electromagnetic radiation incident at the second camera, are (i) represented in second image data captured by the second camera and (ii) not represented in first image data captured by the first camera;

capturing, using the first camera, first image data;

capturing, using the second camera, second image data;

annotating, using one or more frames of captured second image data comprising the imaged markers, locations of the markers at the occupant within one or more frames of captured first image data; and training the vehicular occupant monitoring system using the annotated one or more frames of captured first image data, wherein the trained vehicular occupant monitoring system is configured to monitor occupants of a vehicle equipped with the vehicular occupant monitoring system.

2. The method of claim 1, wherein the first range of wavelengths of electromagnetic radiation comprises one selected from the group consisting of (i) visible electromagnetic radiation and (ii) near infrared electromagnetic radiation.

3. The method of claim 1, wherein the second range of wavelengths of electromagnetic radiation comprises thermal infrared electromagnetic radiation.

4. The method of claim 1, wherein the markers comprise thermal markers, and wherein each respective thermal marker of the thermal markers, when imaged by the second camera, has a temperature different from the ambient temperature of the surroundings of the respective thermal marker.

5. The method of claim 4, wherein each respective thermal marker of the thermal markers, when imaged by the second camera, has a temperature greater than the ambient temperature of the surroundings of the respective thermal marker.

6. The method of claim 4, wherein each respective thermal marker of the thermal markers, when imaged by the second camera, has a temperature less than the ambient temperature of the surroundings of the respective thermal marker.

7. The method of claim 1, wherein disposing the markers at the occupant of the test vehicle comprises disposing the markers at respective regions of interest of the occupant for the vehicular occupant monitoring system.

8. The method of claim 7, wherein the regions of interest comprise one or more joints of the occupant.

9. The method of claim 8, wherein the one or more joints of the occupant comprises at least one of (i) a wrist of the occupant, (ii) an elbow of the occupant and (iii) a shoulder of the occupant.

10. The method of claim 1, wherein the vehicular occupant monitoring system is trained to classify an activity of the occupant of the vehicle equipped with the vehicular occupant monitoring system.

11. The method of claim 1, wherein annotating the one or more frames of the first image data comprises translating the locations of the markers from the second image data to the one or more frames of the first image data.

12. The method of claim 1, wherein the first camera comprises an occupant monitoring camera of the vehicular occupant monitoring system.

13. The method of claim 1, wherein the second camera is disposed at the first camera.

14. The method of claim 1, wherein the first camera and the second camera are the same camera, and wherein the first camera captures the first image data via a first filter that filters the second range of wavelengths of electromagnetic radiation, and wherein the second camera captures the second image data via a second filter that filters the first range of wavelengths of electromagnetic radiation.

15. The method of claim 1, wherein the vehicle equipped with the vehicular occupant monitoring system comprises the test vehicle.

16. A method for training a vehicular occupant monitoring system, the method comprising:

disposing a first camera at a test vehicle, wherein the first camera views at least a seat within an interior cabin of the test vehicle, and wherein the first camera is operable to capture first image data representative of electromagnetic radiation incident at the first camera and having a first range of wavelengths;

disposing a second camera at the test vehicle, wherein the second camera views at least the seat within the interior cabin of the test vehicle, and wherein the second camera is operable to capture second image data representative of electromagnetic radiation incident at the second camera and having a second range of wavelengths;

wherein the first range of wavelengths of electromagnetic radiation comprises one selected from the group consisting of (i) visible electromagnetic radiation and (ii) near infrared electromagnetic radiation;

wherein the second range of wavelengths of electromagnetic radiation comprises thermal infrared electromagnetic radiation;

wherein the first range of wavelengths of electromagnetic radiation and the second range of wavelengths of electromagnetic radiation are different;

disposing markers at an occupant seated at the seat of the test vehicle, wherein the markers, based on the first range of wavelengths of electromagnetic radiation incident at the first camera and the second range of wavelengths of electromagnetic radiation incident at the second camera, are (i) represented in second image data captured by the second camera and (ii) not represented in first image data captured by the first camera;

capturing, using the first camera, first image data;

capturing, using the second camera, second image data;

annotating, using one or more frames of captured second image data comprising the imaged markers, locations of the markers at the occupant within one or more frames of captured first image data; and training the vehicular occupant monitoring system using the annotated one or more frames of captured first image data, wherein the trained vehicular occupant monitoring system is configured to monitor occupants of a vehicle equipped with the vehicular occupant monitoring system.

17. The method of claim 16, wherein the markers comprise thermal markers, and wherein each respective thermal marker of the thermal markers, when imaged by the second camera, has a temperature different from the ambient temperature of the surroundings of the respective thermal marker.

18. The method of claim 17, wherein each respective thermal marker of the thermal markers, when imaged by the second camera, has a temperature greater than the ambient temperature of the surroundings of the respective thermal marker.

19. The method of claim 17, wherein each respective thermal marker of the thermal markers, when imaged by the second camera, has a temperature less than the ambient temperature of the surroundings of the respective thermal marker.

20. The method of claim 16, wherein disposing the markers at the occupant of the test vehicle comprises disposing the markers at respective regions of interest of the occupant for the vehicular occupant monitoring system.

21. The method of claim 20, wherein the regions of interest comprise one or more joints of the occupant.

22. A method for training a vehicular occupant monitoring system, the method comprising:

disposing a first camera at a test vehicle, wherein the first camera views at least a seat within an interior cabin of the test vehicle, and wherein the first camera is operable to capture first image data representative of electromagnetic radiation incident at the first camera and having a first range of wavelengths;

disposing a second camera at the test vehicle, wherein the second camera views at least the seat within the interior cabin of the test vehicle, and wherein the second camera is operable to capture second image data representative of electromagnetic radiation incident at the second camera and having a second range of wavelengths;

wherein the first range of wavelengths of electromagnetic radiation and the second range of wavelengths of electromagnetic radiation are different;

disposing markers at an occupant seated at the seat of the test vehicle, wherein the markers, based on the first range of wavelengths of electromagnetic radiation incident at the first camera and the second range of wavelengths of electromagnetic radiation incident at the second camera, are (i) represented in second image data captured by the second camera and (ii) not represented in first image data captured by the first camera;

wherein disposing the markers at the occupant of the test vehicle comprises disposing the markers at one or more joints of the occupant;

capturing, using the first camera, first image data;

capturing, using the second camera, second image data;

annotating, using one or more frames of captured second image data comprising the imaged markers, locations of the markers at the occupant within one or more frames of captured first image data; and training the vehicular occupant monitoring system to classify an activity of the occupant of the test vehicle using the annotated one or more frames of captured first image data, wherein the trained vehicular occupant monitoring system is configured to classify activities of occupants of a vehicle equipped with the vehicular occupant monitoring system.

23. The method of claim 22, wherein annotating the one or more frames of the first image data comprises translating the locations of the markers from the second image data to the one or more frames of the first image data.

24. The method of claim 22, wherein the first camera comprises an occupant monitoring camera of the vehicular occupant monitoring system.

25. The method of claim 22, wherein the second camera is disposed at the first camera.

* * * * *